US008490267B2

(12) United States Patent
Stone

(10) Patent No.: US 8,490,267 B2
(45) **Date of Patent: *Jul. 23, 2013**

(54) METHOD AND SYSTEM FOR ASSEMBLY OF LIGHTING FIXTURES

(75) Inventor: Thomas A. Stone, University Park, IA (US)

(73) Assignee: Musco Corporation, Oskaloosa, IA (US)

( * ) Notice: Subject to any disclaimer, the term of this patent is extended or adjusted under 35 U.S.C. 154(b) by 177 days.

This patent is subject to a terminal disclaimer.

(21) Appl. No.: 12/905,547

(22) Filed: Oct. 15, 2010

(65) Prior Publication Data

US 2011/0035926 A1 Feb. 17, 2011

Related U.S. Application Data

(63) Continuation of application No. 11/368,912, filed on Mar. 6, 2006, now Pat. No. 7,874,055.

(60) Provisional application No. 60/658,709, filed on Mar. 4, 2005.

(51) Int. Cl.
*B23Q 17/00* (2006.01)
*F21V 7/00* (2006.01)

(52) U.S. Cl.
USPC ......... 29/407.1; 29/407.09; 29/428; 362/297; 362/346; 362/350

(58) Field of Classification Search
USPC .... 29/707, 720, 721, 407.01, 407.04–407.05, 29/407.09, 428, 525.01–525.02; 362/297, 362/305, 346, 350
See application file for complete search history.

(56) References Cited

U.S. PATENT DOCUMENTS

| | | | |
|---|---|---|---|
| 3,710,095 | A | 1/1973 | Donohue et al. |
| 4,816,974 | A | 3/1989 | Gordin |
| 4,947,303 | A | 8/1990 | Gordin et al. |
| 5,161,883 | A | 11/1992 | Gordin et al. |
| 5,402,327 | A | 3/1995 | Gordin et al. |
| 5,600,537 | A | 2/1997 | Gordin et al. |
| 5,607,229 | A | 3/1997 | Rykowski et al. |
| 5,816,691 | A | 10/1998 | Gordin et al. |
| 5,856,721 | A | 1/1999 | Gordin et al. |
| 5,931,574 | A | 8/1999 | Uchida |
| 6,036,338 | A | 3/2000 | Gordin |

*Primary Examiner* — Alexander P Taousakis

(74) *Attorney, Agent, or Firm* — McKee, Voorhees & Sease, P.L.C.

(57) ABSTRACT

An apparatus, method and system for assembling lighting fixtures where reflective inserts are installed into a reflector frame to create a reflective surface for the fixture. According to one aspect of the method, some type of worker-perceivable indication prompts a worker as to which reflective insert should be installed at which mounting location on the reflector frame. The worker does not have to guess or translate written instructions. The method can be used sequentially to provide such assistance for each of a plurality of reflective inserts for a plurality of mounting locations. The method is particularly helpful if the reflective inserts are not identical for each mounting location. According to one aspect of an apparatus according to the invention, a reflector frame is removably mounted to a machine that holds the reflector frame in an indexed position. A controller generates a signal that produces the worker-perceivable indication that correlates for the worker the assigned reflective insert for each mounting position. This can be done with LEDs or other types of lights.

28 Claims, 6 Drawing Sheets

METHOD AND SYSTEM FOR ASSEMBLY OF LIGHTING FIXTURES

REFERENCE TO RELATED APPLICATIONS

This application is a continuation of U.S. Ser. No. 11/368,912, filed Mar. 6, 2006, which is a non-provisional application claiming priority to U.S. Ser. No. 60/658,709, filed Mar. 4, 2005, which applications are incorporated by reference herein in their entirety.

INCORPORATION BY REFERENCE

The contents of U.S. Pat. No. 6,036,338; U.S. Ser. No. 11/333,477, now abandoned; U.S. Ser. No. 11/334,007, issued as U.S. Pat. No. 7,789,540 on Sep. 7, 2010; U.S. Ser. No. 11/333,995, issued as U.S. Pat. No. 7,467,880 on Dec. 23, 2008; and U.S. Ser. No. 11/333,139, issued as U.S. Pat. No. 7,740,381 on Jun. 22, 2010; are each hereby incorporated by reference in its entirety.

BACKGROUND OF THE INVENTION

A. Field of the Invention

The present invention relates to a method and system of manufacturing lighting fixtures, in particular, a method and system of installing highly reflective inserts into a reflector frame.

B. Problems in the Art

Some wide area lighting fixtures consist of a bowl-shaped spun aluminum reflector. The bowl-shape functions as both the fixture housing and the reflecting surface. Other fixtures utilize a framework or housing into which a separate reflecting surface is placed or added. An example of this latter type is Musco Corporation U.S. Pat. No. 6,036,338 (incorporated by reference herein). A similar general bowl-shape as with conventional spun aluminum reflectors is utilized, but a cast reflector frame is used over which a plurality of wedge shaped, highly reflective strips are mounted. As discussed in U.S. Pat. No. 6,036,338, use of high reflectivity material for the strips can produce more light to the target by reducing light loss that is experienced with a spun aluminum reflector surface. Additionally, it allows flexibility in creating beam shape and characteristics. Shape, angle of curvature, and reflecting characteristics of the inserts can, for example, vary the beam width, shape, or characteristics. All the inserts can be the same or certain ones can vary. Further discussion of alternatives can be found in U.S. Pat. No. 6,036,338.

It is desirable to have relatively easy but secure mounting system for the inserts. These fixtures tend to have desired life spans of decades and can experience jostling and vibration. On the other hand, it is desirable to make assembly of such fixtures, and the mounting of a number of individual inserts per fixture, as efficient and accurate as possible.

One way to mount such thin wedge shaped inserts is shown at co-owned, U.S. Ser. No. 11/333,477 (incorporated by reference herein). A set of posts (one near the center of the reflector frame and one near its periphery) exists for each reflective insert, which has slots corresponding with the set of posts. As described in U.S. Ser. No. 11/333,477, the geometry of the posts and the slots allows the insert to basically be snapped into place on the posts. This allows for relatively easy and quick installation of inserts all the way around the reflective frame, as well as a relatively secure and durable mounting of the inserts for the intended environment of such fixtures. The design allows for either inserts of all the same type of be installed around the reflector frame or inserts of varying types in the same reflective frame to create the same or different beam shapes and characteristics, as desired. Thus, one (or just a few) standard reflector frame types can be used to create almost an unlimited number of beam shapes and characteristics by design and selection of the particular inserts assembled into for that fixture.

There can be virtually any number of reflective inserts. In the example U.S. Ser. No. 11/333,477, there are over 30 inserts per reflector frame. If manually inserted, even with the snap-in mount of the posts, this can take significant amounts of labor and time per fixture. Furthermore, especially if the design of a fixture requires a combination of different inserts, the worker must find and correctly install the correct inserts in the correct positions. The issue of accuracy of installation and assembly arises. An error in installation of even one reflector insert can materially affect the beam produced by the fixture.

Also, an important aspect for many of these types of fixtures is that they are used in sets to light an area, for example, a baseball field. In such cases, minimization of number of fixtures is a goal, because it can reduce capital costs as well as operating costs. If an error in assembling reflective inserts occurs in one fixture, it could cause not only that fixture to be erroneous, it might cause the whole lighting system to fail to meet lighting specifications for the field or target. At a minimum, it would result in lighting that is not what the customer ordered.

Therefore, there is a real need for an assembly method and system that promotes absolute accuracy in assembling such reflective inserts into a reflector frame. There is also a real need for such an assembly method and system that promotes efficiency in producing each assembled fixture. Another need is a system and method which promotes high repeatability with minimal training or skill of the assembly workers.

Presently, the burden is substantially on the worker to be right in installing the correct inserts on each fixture according to design. And, there is a substantial burden on the manufacturer to deliver the right product to the customer and meet what was specified. Once these fixtures are up on poles, it is costly and difficult to change them.

SUMMARY OF THE INVENTION

Figure 1:
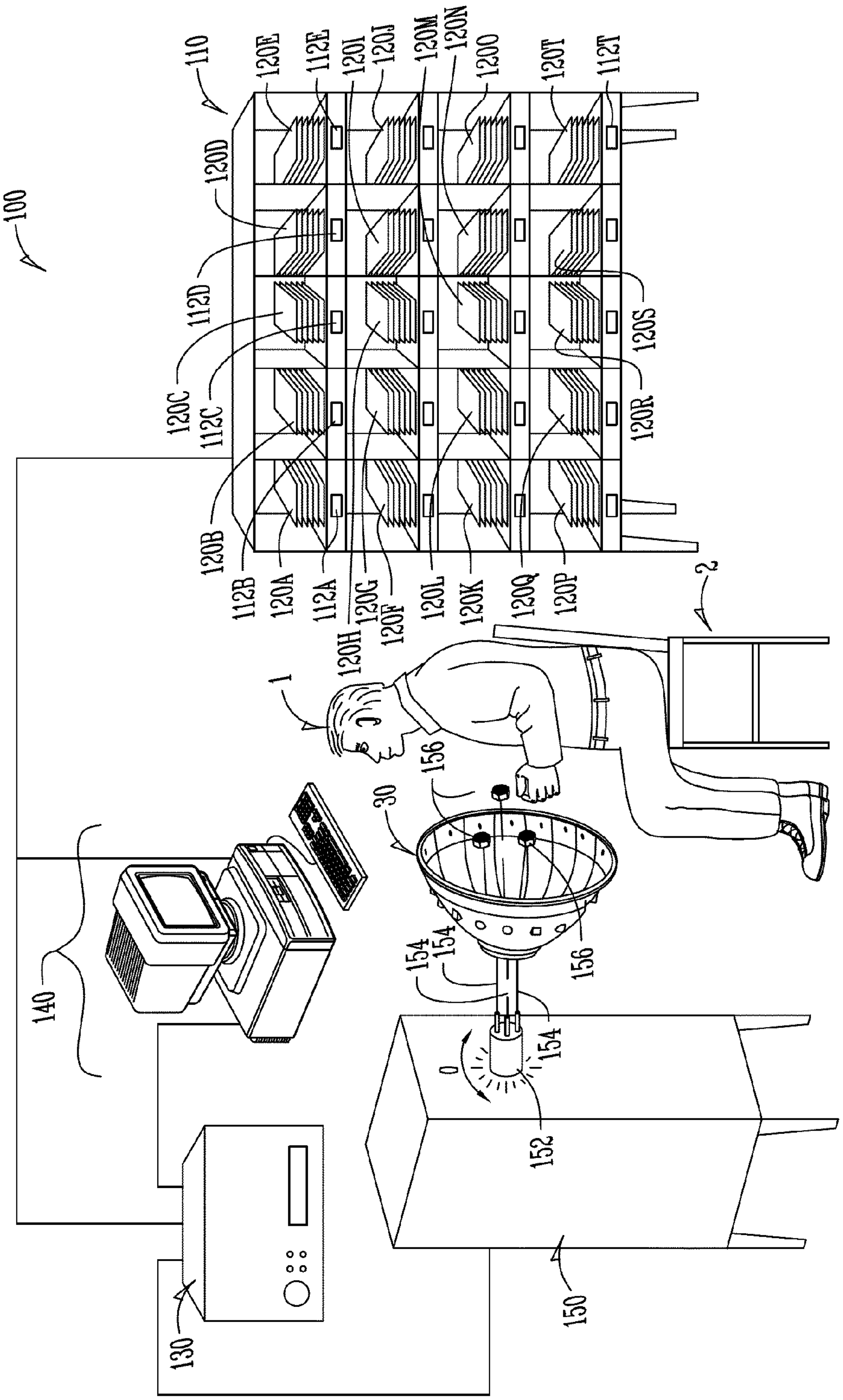
FIG. 1 is a diagrammatic view of a system according to an exemplary embodiment of the present invention or mounting reflective insert strips to the interior of a reflector frame.

The present invention has, as its primary object, to provide a method and system of installing reflective inserts to a reflector frame that improves over or solves problems and deficiencies in the art. Further objects, features, advantages, or aspects of the invention will become more apparent with reference to the accompanying specification.

An object of the present invention is to provide an automatic or semi-automatic system that instructs a worker regarding (a) which specific type of insert is to be installed for (b) a given insert mounting location on the reflector frame.

In one aspect of the invention, an inventory of different inserts is made reasonably accessible to a worker. A worker-perceivable signal automatically activates to indicate which of the inserts should be selected from inventory and installed for a first insert mounting location. A worker-perceivable signal then automatically indicates which of the inserts should be selected from inventory and installed for a second insert mounting location. This would continue until inserts for all mounting locations for that fixture are installed.

In another aspect of the invention, a worker-perceivable signal comprises a light that turns on at or near the type of insert from inventory that is indicated for the particular mounting location.

In another aspect of the invention, the fixture is automatically indexed relative to the worker. For example, a mounting jig can be configured to mount the fixture in preparation for assembly of the inserts into the fixture in a stable fashion relative to the worker. The indexer automatically rotates the fixture to the next insert mounting location for each successive insert to be mounted.

Alternatively, according to another aspect of the invention, the fixture is kept stationary and the worker adds inserts beginning at an initial mounting location and works in a predetermined order of mounting locations and inserts. A worker-perceivable signal indicates on or near the fixture which mounting position is to presently be filled with an insert. The signal could be a light projected onto the mounting position (or near it), or a light separate from the fixture that lights up near the mounting location. This could be a single light that moves relative to the fixture, or a plurality of lights that line up relative to the plurality of mounting locations around the fixture.

In another aspect of the invention, the fixtures are mounted on a machine which automatically rotates the fixture to the mounting location to be filled. For example, it could be In another aspect of the invention, alternatively the fixture could remain stationary and some worker-perceivable signal (e.g., a light) could be projected to the mounting location to be filled, or a light apart from the fixture could light up next to that mounting location. The worker would always see a light at the mounting location to be filled presently and a light at the specific insert from inventory to use for that location so that the worker always knows which insert for which location is indicated.

DETAILED DESCRIPTION OF EXEMPLARY EMBODIMENTS

A. Overview

For a better understanding of the invention, specific examples of forms the invention can take will now be described. These are examples only and variations are possible, such as will be understood by those skilled in the art.

The context of these examples will be with respect to the general type of lighting fixtures indicated at U.S. Pat. No. 6,036,338 and U.S. Ser. No. 11/333,477—bowl-shaped fixtures of the type used many times for wide area or sports field lighting. A plurality of these fixtures are designed to compositely light the field and part of the volume above the field. To do this, normally different fixtures produce different beam shapes and characteristics. For example, some of the beams are narrower and some are wider. U.S. Pat. No. 6,036,338 and U.S. Ser. No. 11/333,477 give examples of some of these types of beams as well as other examples of configurations of a lighting fixture with reflective inserts.

More particularly, the examples herein will be in the context of the type of fixture of U.S. Ser. No. 11/333,477, where there are posts 126 and 128 on the interior of a bowl-shaped cast aluminum reflector frame and corresponding slots 122 and 124 in the inserts 120.

These examples also are in the context of assembling a set of fixtures for a pre-designed lighting application where each fixture has a pre-designed beam shape and characteristic. Utilizing known techniques, typically some fixtures may be the same in beam shape and characteristic but usually not all. Therefore, different inserts are usually utilized for at least some different fixtures and sometimes different inserts are installed in the same fixture.

B. System and Apparatus

One exemplary system 100 according to the present invention is diagrammatically illustrated at FIG. 1 herein. This diagram is not to scale but is intended to show the basic components of such a system and their relationship to one another.

A worker 1 has access to a reflector frame 30 that is to be assembled with a plurality of reflective inserts 120. Worker 1 could stand or be in a chair 2 that could, for example, be on rollers to facilitate easy movement between (a) reflector frame 30 and (b) an inventory of different reflective inserts 120A-T stored in an insert inventory rack 110.

In this embodiment 100, an indexer machine 150 includes a rotatable spindle 152 having a set of mounting bolts 154 at its distal end. Reflector frame 30 has matching holes to allow it to be mounted to spindle 152 and temporarily secured by nuts 156 to bolts 154. Other mounting methods are, of course, possible. For example, a clamping mechanism could be mounted on the end of spindle 152 and configured to receive and releasably clamp reflector frame 30 to spindle 152 through the opening in the center of reflector frame 30. Such clamping and release of clamping could be mechanical. For example, a pneumatically powered clamp could be used. It need to be robust enough to hold a reflector frame 30 in position to allow the snap-in reflective inserts to be put in place.

Spindle 152 is rotatable around its longitudinal axis. There is a zero or twelve o'clock position on machine 150 (indicated in FIG. 1). A variety of these types of machines are commercially available and can be configured as needed for this purpose. They can be adjusted to turn spindle 152 a predetermined or pre-set angular amount each actuation. indicated that the mounting location to be filled will always be at a twelve o'clock position relative to the worker. A control. would rotate the fixture so that the next mounting position to be filled will always be at twelve o'clock relative to the worker. The worker will never have to guess as to which mounting position is presently to be filled. The worker would enter an indication to the controller when the first insert is installed, or the controller could automatically rotate the fixture to the next position (e.g. after a certain time). The controller would then rotate the fixture to the next position. A light or other worker-perceivable signal would indicate which insert t from inventory is to be installed in that next position. Once installed in the second position, the indexer moves the fixture to the third mounting location, a light indicates Which insert from inventory to install, and this would be repeated for the number of mounting locations for that fixture.

Therefore, indexer 150 presents reflector frame 30 to worker 1 in a position so worker 1 is always working On the insert mounting location on reflector frame 30 that is in the zero or twelve clock position.

It is to be understood that the process can be what will be called "semi-automatic". For example, a powered indexer machine 150 could have a control (e.g. a push button or a floor-mounted pedal) that the worker could push each time he/she has mounted a reflective insert and wishes to rotate reflector frame 30 to the next programmed position. The programming will handle the direction and amount of rotation, but the worker must hit the button or pedal to cause the same. A more fully automatic system might sense when an insert is in place and automatically rotate to the next position. It could also do so based on a certain time interval.

Rack 110 presents, within a reasonable distance to worker 1, an inventory of inserts 120. In this example it shows inserts 120A-T. Each would have different characteristics and configurations.

For example, U.S. Pat. No. 6,036,338 and U.S. Ser. No. 11/333,477 speak to some of the differences these inserts can have. For example, it could be width, amount of curvature, amount of reflectivity, amount of specularity, amount of diffuseness, or even surface texture such as peens or dimples or steps. A variety of options are possible and are not listed exhaustively here. As described in U.S. Pat. No. 6,036,338 and U.S. Ser. No. 11/333,477, these characteristics and configurations of inserts 120 can determine the nature of how light is reflected from them and can alter the shape or characteristic of the beam from the fixture.

The number of different inserts 120 can vary. A typical example would be approximately six to ten different inserts for a given lighting installation. However, it could of course be less or more. The inserts 120 shown and described are trapezoidal in shape; specifically isosceles trapezoids. Different shapes and sizes are possible.

Rack 110 could include a light 112 (e.g., red LED) at each location for each different type of insert 120. Each LED 112 could be operatively connected to some type of controller and electrical power source.

A personal computer or PC 140 and controller 130 could be configured with appropriate software to automatically or semi-automatically control system 100. As discussed previously, the design of the lighting system with which fixture 30 will be utilized has usually been predetermined. In this example for a lighting system for a baseball field, specific beam shape and characteristic for each of thirty-eight fixtures 30 for a system has been predetermined and designed. This information can be loaded into PC 140. The specific type of insert 120 for each mounting location on each of those thirty-eight reflector frames 30 can be loaded into and is therefore known in PC 140 (e.g. in a database).

For a typical baseball field, there may be five or six different beam shapes and configurations that are used. Examples would be 1) near field beams, 2) far field beams, 3) fixtures with short visors, 4) fixtures with long visors, and 5) fixtures with translucent inserts in a long visor to allow for some up lighting. The reflective inserts 120 may vary for each of these different types of beams and fixtures.

The indexer machine 150 can be any of a variety of types. There are many-of examples of commercially available programmable positioners, including those that allow programmable rotation. For example, some allow programmable movement of work pieces relative to a machining or drilling tool, Some allow programmable movement of a work piece relative to a welding machine. These or similar somewhat sophisticated machines could be used for very precise rotational positioning. On the other hand, simpler and less costly machines that simply rotate a work piece incrementally could also be adapted. Furthermore, in a very simple embodiment, indexer 150 could simply be a rotatable spindle mounted on a base. Some type of indexing marks could be placed on the base to some rotational position relative the spindle. The worker would simply match a mounting position on the reflector frame with the indexing markings around the spindle of the machine to manually rotate the reflector frame.

Some of the figures in U.S. Ser. No. 11/333,477 show long and short visors and how they can be attached to reflector frame 30. See also co-owned, U.S. Ser. No. 11/1334,007 now U.S. Pat. No. 7,789,540 incorporated by reference herein. Those drawings also include some examples of different reflective inserts 120 and their slots 122 and 124.

The figures of co-owned, U.S. Ser. No. 11/333,995, now U.S. Pat. No. 7,467,880, incorporated by reference herein, illustrate details about a translucent insert that could be added to the long visor to provide some additional uplighting above the field.

The figures of co-owned, U.S. Ser. No. 11/333,139, now U.S. Pat. No. 7,740,381, incorporated by reference herein, show different variations of a reflector frame 30 and details about posts 126 and 128.

PC 140 would contain the data for how each of the fixtures would be assembled, particularly which inserts from inventory for which mounting locations should be used for each fixture.

PC 140 would then instruct controller 130 (e.g. a programmable logic controller or PLC) to in turn instruct indexer 150 to rotate mounted reflector frame 30 to the first mounting location and align it with the zero or twelve o'clock position. PC 140 would also instruct the appropriate light 112 to illuminate for the specified insert 120 for that first mounting location on reflector frame 30. Alternatively, just a PLC may be sufficient to control the whole system.

The worker is instructed he/she is to add an insert 120 at the zero or twelve o'clock position of reflector frame 30 and that the insert must be the insert from inventory on rack 110 that is indicated by the illuminated light. This, of course, presumes that the appropriate inserts are correctly loaded in the appropriate positions in rack 110.

The worker then removes the appropriate insert 120 and installs it on the appropriate mounting location of reflector frame 30.

PC 140 would next instruct controller 130 to instruct indexer 150 to rotate reflector frame 30 to the next mounting location (usually, but not always, a next adjacent position). PC 140 would illuminate the appropriate light 112 on rack 110 to instruct the worker which insert 120 to place at that next mounting location. The next mounting location would again be at the zero or twelve o'clock position. This would continue until all required or desired inserts 120 are added to that reflective frame 30.

The worker can then complete the assembly of reflector frame 30 (e.g., insert a lamp, place a lens over the fixture, etc.) and then remove it from indexer 150 and replace it with the next reflector frame 30, or could remove the partially assembled fixture (with inserts 120 added) and move it to another location for further or final assembly.

PC 140 would then control the process for that next fixture for the lighting system. Generally each of the thirty-eight fixtures or reflector frames 30 for the baseball field would be identified by a number to keep track of each (the number could be stamped or applied to each frame 30). The computer 140 would have information about which insert(s) to use for each fixture. The worker would therefore know which reflector frame is being currently worked on. The number could be applied on the reflector frame 30 and might also be displayed on the PC 140, for example.

Thus, system 100 presents an automatic or semi-automatic system for assembling lighting fixtures utilizing a plurality of reflector inserts.

Figure 3:
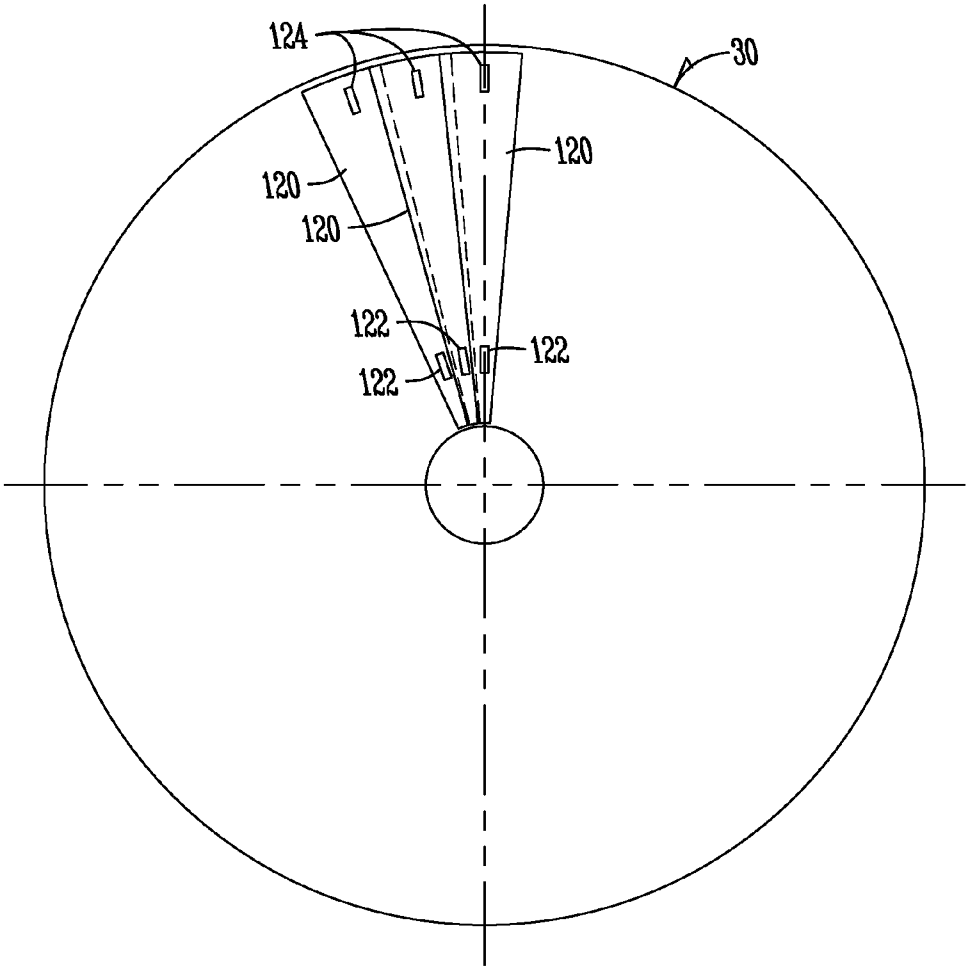
FIG. 3 is a still further enlargement of FIG. 2F, showing an overlap between mounted reflective inserts according to an exemplary embodiment of the present invention.
Figure 4:
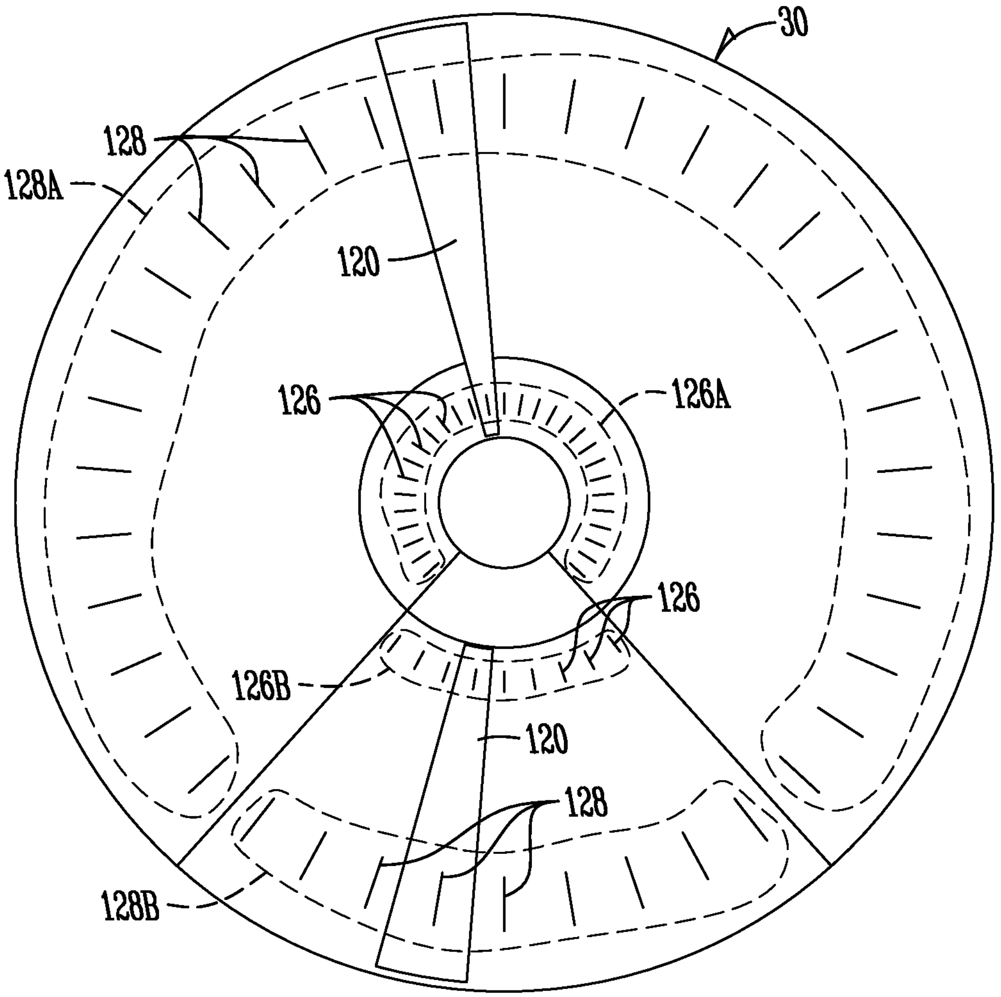
FIG. 4 is an enlarged front elevation diagram of a reflector frame such as in FIG. 1 showing in more detail mounting locations for reflective inserts, and mounting locations for different types of reflective inserts.

FIGS. 3 and 4 herein give details about this type of reflector fame 30 and how inserts 120 can be mounted to it.

As shown in FIG. 4, there are a plurality of spaced apart inner posts 126 at or near the center of reflector frame 30. In this case, one subset of the inner posts 126 (circled at reference number 126A in FIG. 4) are close in radially around the center of reflector frame 30. Another set of inner posts 126 (circled at reference numeral 126B) are a little farther away from the center.

Outer posts 128 include a subset (circled at 128A) around the approximate 270 upper degrees of the reflector frame 30 near its periphery. Another set (circled at 128B) correspond with the inner set 126B and are also at the periphery of reflector frame 30 but in the lower 90° or so.

A set of inner and outer posts 126 and 128 exist essentially along radiuses from the center of reflector frame 30. As indicated in FIG. 3, a narrower end of each reflector insert 120 fits over an inner post 126 and extends out into the wider end which fits over an outer post 128. Slots 122 and 124 at inner and outer ends of inserts 120 respectively, fit over corresponding posts 126 and 128. This is described further in U.S. Ser. No. 11/333,477. Other mounting formats or configurations are possible, however.

C. Method

Thus, in this example, a lighting system is pre-designed to have a plurality of fixtures each with a reflector frame 30. The design specifies a beam shape and characteristic for each fixture. PC 140 can therefore be programmed to store the type of insert 120 for each mounting location for each particular fixture for the system. PC 140 will know how many fixtures, how many insert mounting locations per fixture, and which inserts are designed for each mounting locations. The way in which information is entered into PC 140 can vary. Normal data entry methods can be used (e.g. keyboard entry). Alternatives are, of course, possible. For example, there could be some type of database created in a different computer that could be transferred to computer 140. There could even be such things as bar codes or other machine-readable data which could contain the appropriate information for a given reflector frame to cause the semi-automatic or automatic processes described herein.

The system also allows for different workers to work on fixtures in different places or times. A computerized system could keep track of which fixtures are or have been assembled, and issue work orders for the remainder.

PC 140 then controls system 100 to index a reflector frame 30 so the worker always has the current mounting position to be filled with an insert in a consistent orientation to the worker, and PC 140 lights up a light 112 for the particular insert 120 on rack 110 to use for that position.

Figure 2A:
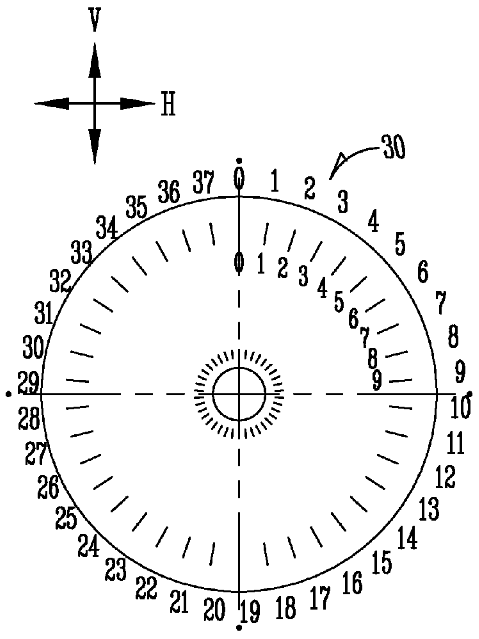
FIGS. 2A-K are enlarged front elevation diagrams of the reflector frame of FIG. 1 showing method steps for mounting the reflective inserts according to an exemplary embodiment of the present invention.
Figure 2B:
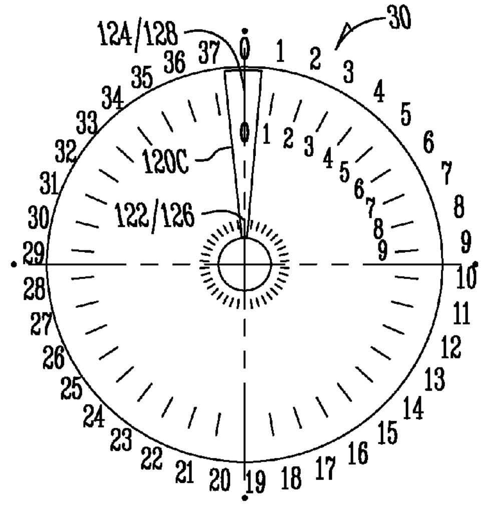

FIGS. 2A-2K diagrammatically illustrate in a rough, not-to-scale form, some of the concepts of the methodology. Initially, reflector frame 30 is mounted to indexer 150 either originally so that its zero or twelve o'clock position is aligned with the zero or twelve o'clock position on indexer 150 (See FIG. 2A). System 100 lights up the reflector insert 120 from rack 110 to apply to that position (for example, light 1120 illuminates indicating to worker 1 to install a reflector insert l20C to the first mounting location at zero position on reflector frame 30 (see FIG. 2B)) Inner slot 122 of insert 120C is placed over post 126 and outer slot 124 in insert 120C placed over outer post 128 and the first insert 120 is installed (FIG. 2B). and outer slot 124 in insert 120C is placed over outer post 128 and the first insert 120 is installed (FIG. 2B).

Figure 2C:
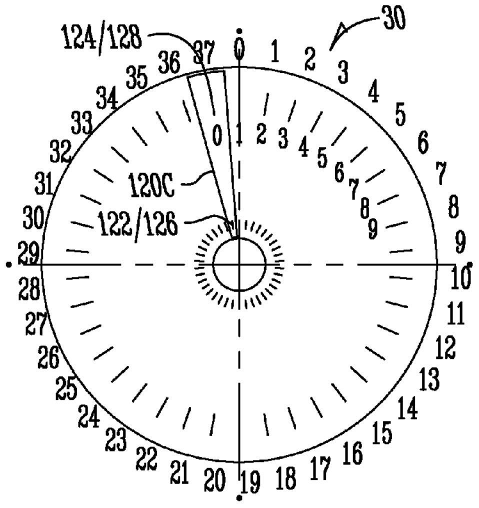

Indexer 150 rotates reflector frame 30 one mounting position counter-clockwise (FIG. 2C). Now, mounting position 1 on reflector frame 30 is aligned with the zero or o'clock position on indexer 150. The installed reflector insert 120C at reflector frame 30 mounting position zero has moved over one position.

Figure 2D:
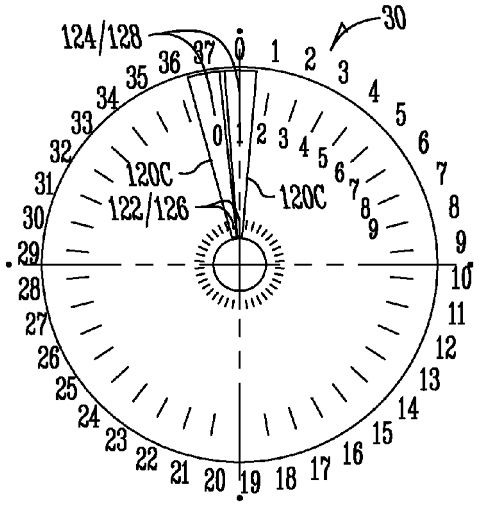

System 100 lights up insert inventory rack 110 light 112C and worker installs another insert of the type of 120C at the twelve o'clock mounting location for reflector frame 30 (see FIG. 2D).

LED lights have been discussed as one option for providing a worker-perceivable indication, indicator, or signal. They are relatively low power and long-lasting. Other lights are possible, including lights that would project a beam that would point the worker to a location. For example, a single laser beam or concentrated beam could be manipulated by an appropriate controller or actuator to shine the beam on the current correct position on insert rack 110. Similarly, a beam could be directed to point out the correct current mounting position on reflector frame 30. However, other forms of worker-perceivable indicators are possible. For example, some type of graphic could be displayed on the screen of PC 140 which prompts and instructs the worker as to which insert to use on what mounting position. As another example, there could be auditory information given to the worker instead or, or in addition to, visual information. The system could literally tell the worker through ear phones or speakers which insert is to be used for which mounting locations.

One aspect of the system would simply be to provide the worker with information that shows the worker which insert is appropriate for a given mounting location. It could be simply prompting and pointing out the appropriate insert from an inventory of inserts. It could be prompting and pointing out the appropriate mounting location on the reflector frame. It could be both.

Figure 2E:
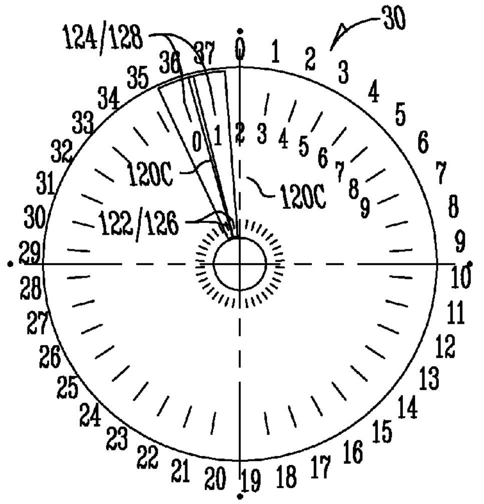
Figure 2F:
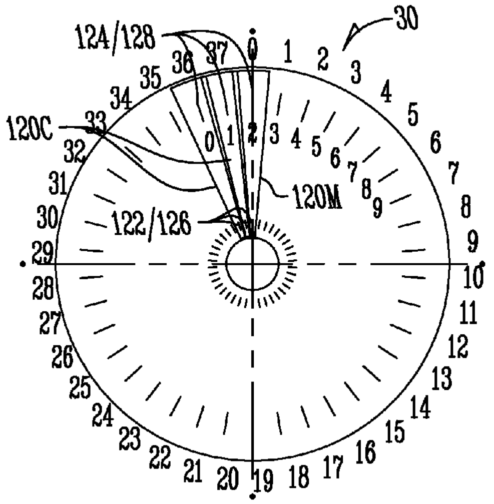

Indexer 150 then increments again to put reflector frame 30 mounting position 2 at the zero or twelve o'clock position on indexer 150 (FIG. 2E). In this case, PC 140 lights up light 112M and worker takes reflector insert 120M from rack 110 and installs it (FIG. 2F).

Figure 2G:
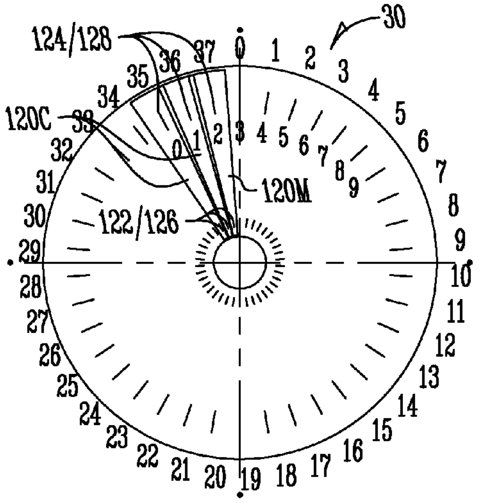
Figure 2H:
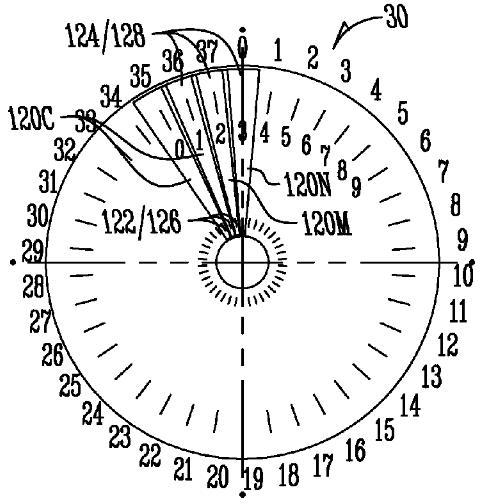
Figure 2I:
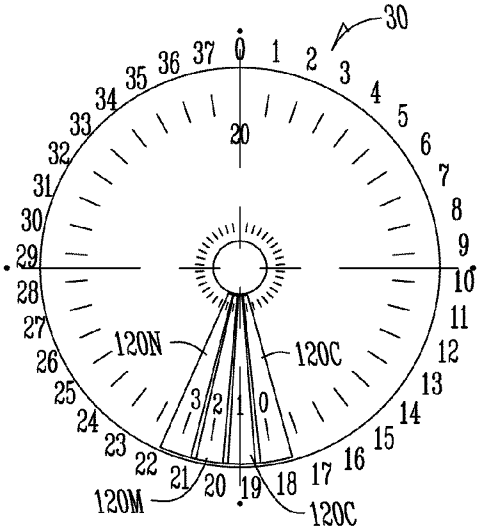

Indexer 150 is instructed to increment again counter-clockwise, moving mounting location 3 of frame 30 to the zero or twelve o'clock index position (FIG. 2G). In this case, light 112N on rack 110 lights up and worker 1 removes and installs a still further different insert 120N in mounting location 3 (FIG. 2H).

Figure 2J:
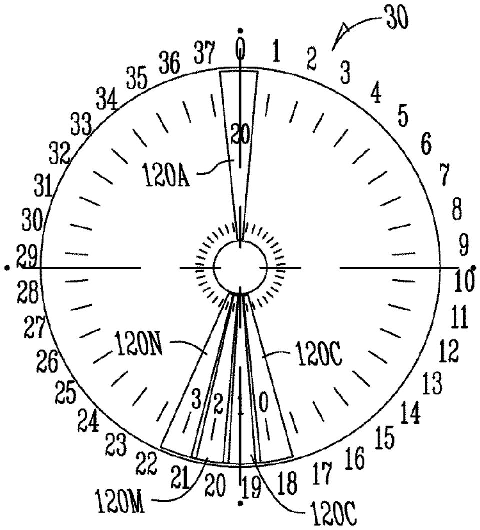
Figure 2K:
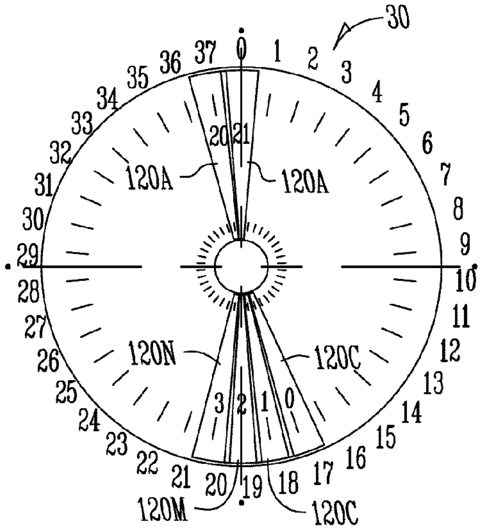

This can continue in a counter-clockwise, incremental indexing procedure around the entire frame 30. Alternatively, indexer 150 could move to a spaced apart mounting location, for example, mounting location 20 (FIG. 21). The already installed inserts 120C, 120M, and 120N at mounting location 0, 1, 2, and 3, would then rotate towards the bottom and mounting location 20 would be in the zero or twelve o'clock position for worker 1. Computer 140 would light up appropriate insert location in rack 110, here light 112A, and worker 1 would be prompted to install insert 120A at position 20 (FIG. 2J). Indexer 150 could then increment one mounting location, and rack 110 could light up for the next insert (here another insert 120A), and install it in position 21, for example (FIG. 2K).

It is to be understood that a set of inserts 120 will usually be installed one right after another (adjacent mounting locations). As shown in FIG. 3 in this embodiment, there will be some overlap along the adjacent edges of each insert 120 (see ghost lines indicating an overlap between adjacent inserts 120). Essentially they are like shingles, there is a little bit of overlap on succeeding ones. It can be important that the overlap be in a designated direction for certain sets of inserts. Therefore, as indicated at FIGS. 2A-K, programming could allow several inserts to be placed overlapping and adjacent one another over a first angular range of frame 30. Then there could be another set overlapped in a different direction (which would rotate frame 30 incrementally in the opposite direction).

It is to be understood, however, that the reflector frame 30 does not necessarily have to be rotated. It could be held static. It could have markings on its insert mounting surface that identify the pairs of mounting pins for each insert. The system could simply instruct the worker as to the appropriate insert type for each mounting location on frame 30, and the worker would install said insert by matching the insert to the instructed set of mounting pins. However, to help accuracy, both the correct insert and the correct location could be indicated to the worker. For example, an LED could light up next to the correct insert in rack 110. If the frame 30 is held stationary, a set of LEDs could be positioned around the perimeter of frame 30 when mounted on indexer 50; one LED for each mounting position. The controller could light up the appropriate LED for the appropriate mounting position. The worker would then have one light instructing him/her which insert 120 to use, and a light showing where on reflector frame 30 to put that insert. Thus, a correlation that is worker-perceivable for both things is created in such an arrangement. In comparison, in the prior example, the system would rotate reflector frame 30 to the home or zero position each time another insert is to be mounted. The worker would thus have a worker-perceivable indication of the mounting location by always looking for and using the zero or twelve o'clock position as the mounting location. The correct insert 120 for that location can be pointed out in a worker-perceivable method. This could be a light or otherwise.

D. Options

As indicated previously, inserts 120 can vary in shape and characteristic. Some specific examples are given in the disclosures which are incorporated by reference. Others are possible.

Number of positions can vary. Also, in some circumstances, the width of an insert would cover two sets of mounting posts 126/128. This could be programmed in the computer 140 and it could increment or index frame 30 accordingly.

The number of inserts 120 available in inventory rack 110 can vary. It does not necessarily have to be a rack but could be individual boxes or containers or other type of system to store or retrieve the different inserts.

Instead of rotating the reflector frame 30 to an indexing position, a moveable light or some sort of a projector could light up certain mounting locations on a stationary reflector frame 30. Or there could be some sort of a ring of lights where computer 140 would light up the appropriate one on a stationary frame 30.

The exemplary embodiments and these options contemplate that the worker would always have some indication or consistent knowledge of which mounting position is to be filled presently and which type insert is to be used, One alternative example might be that a display screen on computer 140 would simply indicate a position and insert type for that particular fixture. In these exemplary examples, however, there is actually some worker-perceivable signal directly adjacent the inventory of inserts to indicate which one to use.

The system could also be used in a way to address specific or customized lighting changes to a system. In other words, if during the design process for the lighting system, it is determined that some variation in beam shape or characteristic for one or more fixtures is desirable, the computer can easily be instructed and then during the assembly process, for designated fixtures, special inserts can be indicated for the worker. An example would be if a certain fixture is likely to cause glare to a house across from the field, there may be special inserts for one or a couple fixtures to place in just a part of those fixtures to address that problem. This could easily be accommodated and would allow the worker high accuracy. The system would basically instruct those special inserts and the worker would not have to worry about remembering which fixture to put the special inserts in.

There are other ways to change the orientation of frame 30 relative worker 1. It can therefore be appreciated that the invention can take different forms and embodiments. The examples described above are but a few examples and intended to provide an idea of some forms the invention can take. Variations obvious to those skilled in the art are included within the invention.

The method and system could be applied to other things. For example, as seen in U.S. Ser. No. 11/334,007, now U.S. Pat. No. 7,789,540, visors are sometimes added to certain reflector frames. The visors could also have reflective inserts. The concepts described herein could be used to help assemble inserts to such visors before they are installed on reflector frame 30.

What is claimed is:

1. A method of assembling plural reflective inserts into a reflector frame comprising:

a. assigning mounting positions for reflective inserts into the reflector frame;

b. assigning a type of reflective insert for each mounting position;

c. generating a worker-perceivable indication which correlates the assigned type of reflective insert for a first mounting position;

d. mounting the assigned type of reflective insert for the first mounting position into the reflector frame;

e. generating a worker-perceivable indication which correlates the assigned type of reflective insert for a second mounting position; and f. mounting the assigned type of reflective insert for the second mounting position into the reflector frame.

2. The method of claim 1 further comprising generating a worker-perceivable indication which correlates the assigned type of reflective insert for another mounting position, and mounting the assigned type of reflective insert for the another mounting position into the reflector frame.

3. The method of claim 2 further comprising repeating the step of claim 2 until the reflector frame is filled with reflective inserts.

4. The method of claim 1 wherein the reflective insert comprises a relatively thin, elongated member having mounting locations.

5. The method of claim 4 wherein the reflector frame comprises a surface having structure to which a reflective insert can be mounted at its mounting locations.

6. The method of claim 5 wherein the structure on the surface of the reflector frame comprises bosses and the mounting locations on the reflective inserts comprise slots or openings.

7. The method of claim 1 wherein the reflector frame is generally bowl-shaped having a center.

8. The method of claim 7 wherein the reflective inserts each comprise a trapezoid.

9. The method of claim 8 wherein the trapezoid is an isosceles trapezoid.

10. The method of claim 1 wherein the correlation of the assigned type of reflective insert for a mounting position comprises actuating a worker-perceivable indicator related to the assigned type of reflective insert.

11. The method of claim 10 wherein the worker-perceivable indicator is a visually perceivable signal.

12. The method of claim 11 wherein the visually perceivable signal is a light.

13. The method of claim 12 wherein the light is actuated at or near one or more reflective inserts of the assigned type.

14. The method of claim 1 wherein the correlation of the assigned type of reflective insert for a mounting position comprises actuating a worker-perceivable indicator related to the mounting position.

15. The method of claim 14 wherein the worker-perceivable indicator related to the mounting position comprises a worker-perceivable indicator.

16. The method of claim 15 wherein the worker-perceivable indicator is a light.

17. The method of claim 16 wherein the light is actuated at or near the mounting position.

18. The method of claim 16 wherein the light is actuated away from the mounting position by directed to at or near the mounting position.

19. The method of claim 1 wherein the correlation of the assigned type of reflective insert for a mounting position comprises actuating a worker-perceivable indicator related to the assigned reflective insert and the mounting position.

20. The method of claim 19 wherein the worker-perceivable indicator is displayed on a display screen.

21. The method of claim 20 wherein the worker-perceivable indicator comprises pictorial, photographic, graphic and/or alphanumeric indicia illustrating the assigned reflective insert and the assigned mounting location.

22. The method of claim 1 wherein step e proceeds semi-automatically or automatically from step d after confirmation of mounting of the assigned type of reflective insert to the first assigned mounting position.

23. A method of assembling a plurality of reflective inserts into a reflector frame, comprising:

a. providing an inventory of different reflective inserts with a worker-perceivable indicator for each different type of insert;

b. providing a reflector frame to the worker with a worker-perceivable or consistent mounting location presented to the worker for each insert;

c. causing a worker-perceivable indicator to operate for a correlated mounting location;

d. for a first mounting location, installing a reflective insert into the reflector frame based on the worker-perceivable indicator for the type of inert and the worker-perceivable indicator for the mounting location: and e. repeating for subsequent mounting locations.

24. The method of claim 23 wherein two or more inserts are overlapped.

25. The method of claim 24 wherein the overlapping is the same direction.

26. The method of claim 24 wherein at least two or more other inserts are overlapped in a different direction.

27. The method of claim 23 wherein at least two inserts, when mounted, have different curvatures.

28. The method of claim 23 wherein the mounting locations substantially radially surround a light source mounted at the reflector frame.

* * * * *

UNITED STATES PATENT AND TRADEMARK OFFICE
CERTIFICATE OF CORRECTION

PATENT NO. : 8,490,267 B2
APPLICATION NO. : 12/905547
DATED : July 23, 2013
INVENTOR(S) : Thomas A. Stone It is certified that error appears in the above-identified patent and that said Letters Patent is hereby corrected as shown below:

In the Claims:

Col. 12, Claim 23, Line 21:
DELETE after of "inert"
ADD after of --insert--

Signed and Sealed this
Eighth Day of October, 2013

Teresa Stanek Rea
*Deputy Director of the United States Patent and Trademark Office*